(12) United States Patent
Gibson et al.

(10) Patent No.: US 12,125,446 B2
(45) Date of Patent: Oct. 22, 2024

(54) COMPLIANCE VOLTAGE BASED ON DIODE OUTPUT BRIGHTNESS

(71) Applicant: Microsoft Technology Licensing, LLC, Redmond, WA (US)

(72) Inventors: Gregory Theodore Gibson, Seattle, WA (US); Martin Francis Galinski, III, Mountain View, CA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 95 days.

(21) Appl. No.: 17/451,277

(22) Filed: Oct. 18, 2021

(65) Prior Publication Data

US 2023/0120547 A1    Apr. 20, 2023

(51) Int. Cl.
*G09G 3/34* (2006.01)
*G09G 3/00* (2006.01)
*G09G 3/36* (2006.01)

(52) U.S. Cl.
CPC .............. *G09G 3/342* (2013.01); *G09G 3/36* (2013.01); *G09G 3/003* (2013.01); *G09G 3/3413* (2013.01); *G09G 2320/0626* (2013.01); *G09G 2330/021* (2013.01); *G09G 2360/145* (2013.01)

(58) Field of Classification Search
CPC ........ G09G 3/002; G09G 3/003; G09G 3/006; G09G 3/02; G09G 3/025; G09G 3/30–3426; G09G 3/36; G09G 2320/0233; G09G 2320/04; G09G 2320/043; G09G 2320/045; G09G 2320/062; G09G 2320/0626; G09G 2320/0633; G09G 2320/0693; G09G 2330/021; G09G 2330/12; G09G 2360/14–16; H05B 45/10–14; G01R 31/2632–2635; G02B 27/017; G02B 27/0172; H01L 27/3269;
(Continued)

(56) References Cited

U.S. PATENT DOCUMENTS

| 4,523,189 A | * | 6/1985 | Takahara | ................ G09F 13/22 345/80 |
| 5,270,533 A | | 12/1993 | Pulice | |
| 5,600,126 A | | 2/1997 | Appel et al. | |

(Continued)

OTHER PUBLICATIONS

"International Search Report and Written Opinion Issued in PCT Application No. PCT/US22/039355", Mailed Date: Oct. 19, 2022, 15 Pages.

*Primary Examiner* — Keith L Crawley
(74) *Attorney, Agent, or Firm* — Alleman Hall & Tuttle LLP

(57) ABSTRACT

A method for operating a display comprising a plurality of emission diodes. For each emission diode, an output brightness of the emission diode is monitored over a range of compliance voltages. Based on the monitored output brightness of the emission diode, an inflection voltage is determined. At the inflection voltage, increasing a commanded compliance voltage does not yield an above-threshold increase in output brightness. Further, decreasing the commanded compliance voltage from the inflection voltage yields an above-threshold decrease in output brightness. In response to receiving a request for the emission diode to operate at a peak output brightness, an applied compliance voltage is commanded that is within a threshold voltage of the inflection voltage.

20 Claims, 7 Drawing Sheets

(58) Field of Classification Search
CPC .. H01S 3/1305; H01S 3/1306; H01S 5/06223; H01S 5/068–06835
See application file for complete search history.

(56) References Cited

U.S. PATENT DOCUMENTS

| | | | |
|---|---|---|---|
| 6,448,550 B1 * | 9/2002 | Nishimura | H05B 45/22 |
| | | | 250/226 |
| 7,495,203 B2 | 2/2009 | Kaku et al. | |
| 7,756,173 B2 | 7/2010 | Alfrey | |
| 8,742,685 B1 | 6/2014 | Nalbant | |
| 8,907,591 B2 | 12/2014 | Jungwirth | |
| 9,001,854 B2 | 4/2015 | Taubman et al. | |
| 9,084,326 B2 | 7/2015 | Guan et al. | |
| 9,735,541 B1 * | 8/2017 | Zhao | H01S 5/143 |
| 2002/0033676 A1 * | 3/2002 | Harada | G09G 3/30 |
| | | | 315/169.3 |
| 2010/0045190 A1 * | 2/2010 | Cramer | H05B 45/10 |
| | | | 315/151 |
| 2012/0170328 A1 | 7/2012 | Beasley | |
| 2014/0125715 A1 | 5/2014 | Nishino et al. | |
| 2014/0225937 A1 * | 8/2014 | Sudo | G09G 5/10 |
| | | | 345/690 |
| 2015/0326117 A1 * | 11/2015 | Tischler | H05B 45/10 |
| | | | 315/185 R |
| 2016/0073069 A1 * | 3/2016 | Xue | H04N 9/3135 |
| | | | 348/750 |
| 2018/0180468 A1 * | 6/2018 | Wang | G01J 1/0209 |
| 2019/0157839 A1 * | 5/2019 | Gudaitis | H01S 5/0683 |
| 2020/0035764 A1 * | 1/2020 | Chang | H01L 51/52 |
| 2020/0037410 A1 * | 1/2020 | Stoneham | H05B 45/10 |
| 2021/0006035 A1 * | 1/2021 | Price | H01S 5/0683 |
| 2022/0317467 A1 * | 10/2022 | Danziger | G03B 21/2033 |

\* cited by examiner

COMPLIANCE VOLTAGE BASED ON DIODE OUTPUT BRIGHTNESS

BACKGROUND

Emission diodes such as light-emitting diodes (LEDs) and laser diodes are used in an increasing number of applications. LEDs, for instance, are widely used in general illumination applications while laser diodes are commonly used in various imaging applications. As such diodes are integrated into portable devices, application demands for more precise operation of the devices has also increased. Considerations such as power-efficiency, thermal management, and precise control over diode emission spectra and light output present challenges that are less of a concern in stationary device applications.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Furthermore, the claimed subject matter is not limited to implementations that solve any or all disadvantages noted in any part of this disclosure.

A method for operating a display comprising a plurality of emission diodes. For each emission diode, an output brightness of the emission diode is monitored over a range of compliance voltages. Based on the monitored output brightness of the emission diode, an inflection voltage is determined. At the inflection voltage, increasing a commanded compliance voltage does not yield an above-threshold increase in output brightness. Further, decreasing the commanded compliance voltage from the inflection voltage yields an above-threshold decrease in output brightness. In response to receiving a request for the emission diode to operate at a peak output brightness, an applied compliance voltage is commanded that is within a threshold voltage of the inflection point voltage.

DETAILED DESCRIPTION

Any display panel that includes emission diodes by nature includes emission diodes with a wide range of forward voltages. This may be due to differences in current emitted by the different color diodes as well as manufacturing differences that are not necessarily apparent when the emission diodes are fabricated for the display device.

Often, a generic, off-the-shelf converter is utilized for each emission diode, the converter including an internal mechanism to cycle the converter between compliance voltages appropriate for red, green, and blue LEDs, which have markedly different output powers. However, such a one-size-fits-all approach necessitates setting a voltage headroom that is higher than needed by some of the LEDs, to ensure that each and every one of the LEDs operates at peak output power when commanded to do so.

Such an approach uses far more power than is needed to generate display images. Portable displays that operate on battery power may thus demand frequent recharging or tethered operation, making device operation much less enjoyable for the user. Further, the excess power consumed may generate additional heat, which may produce discomfort for users of head-mounted or other near-eye display systems.

Herein, systems and methods are presented whereby each of a plurality of emission diodes of a display panel is monitored so as to compare commanded brightness and actual output brightness. Based on this comparison, an inflection voltage is determined for each monitored emission diode that represents a most efficient use of power for driving the emission diode. The inflection voltage may be used to set the voltage headroom for each emission such diode under a variety of operating conditions, thus ensuring high efficiency operation without sacrificing performance.

Figure 1:
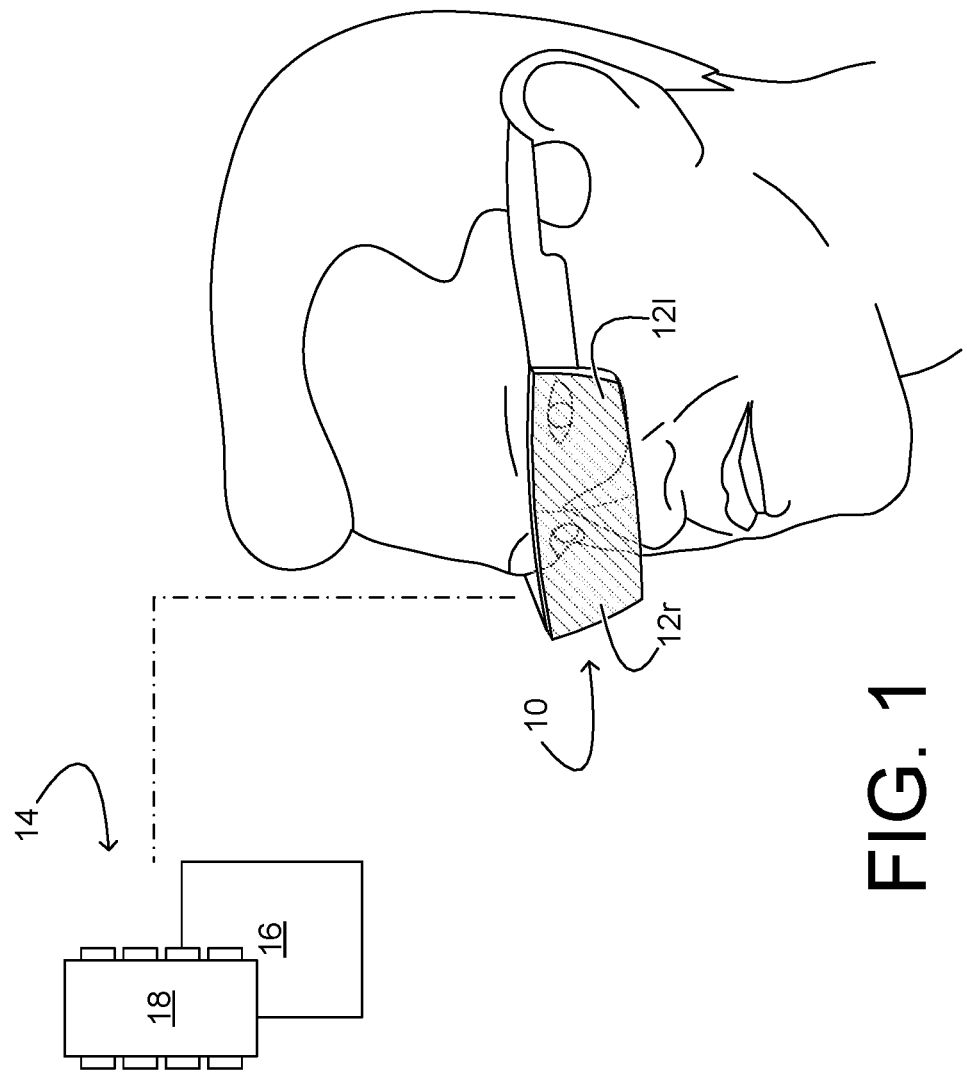
FIG. 1 shows aspects of an example near-eye display system.

FIG. 1 shows aspects of an example near-eye display system 10. The illustrated display system is a binocular display system; it employs a complementary pair of projection displays 12—right-eye display 12R and left-eye display 12L. In other examples, a single projection display may be used for both eyes. Display system 10 includes an integrated computer system 14. Operatively coupled to the projection displays and to other display-system componentry, the computer system includes a logic system 16 and associated computer memory 18. The logic system and computer memory may be configured to render display images provided to the right and left displays, and to enact any processing and control function disclosed herein. It will be noted that the display images formed by the right and left displays are not necessarily identical, but may exhibit a controlled positional disparity in the virtual imagery therein, so as to create a 3D stereo effect.

Figure 2:
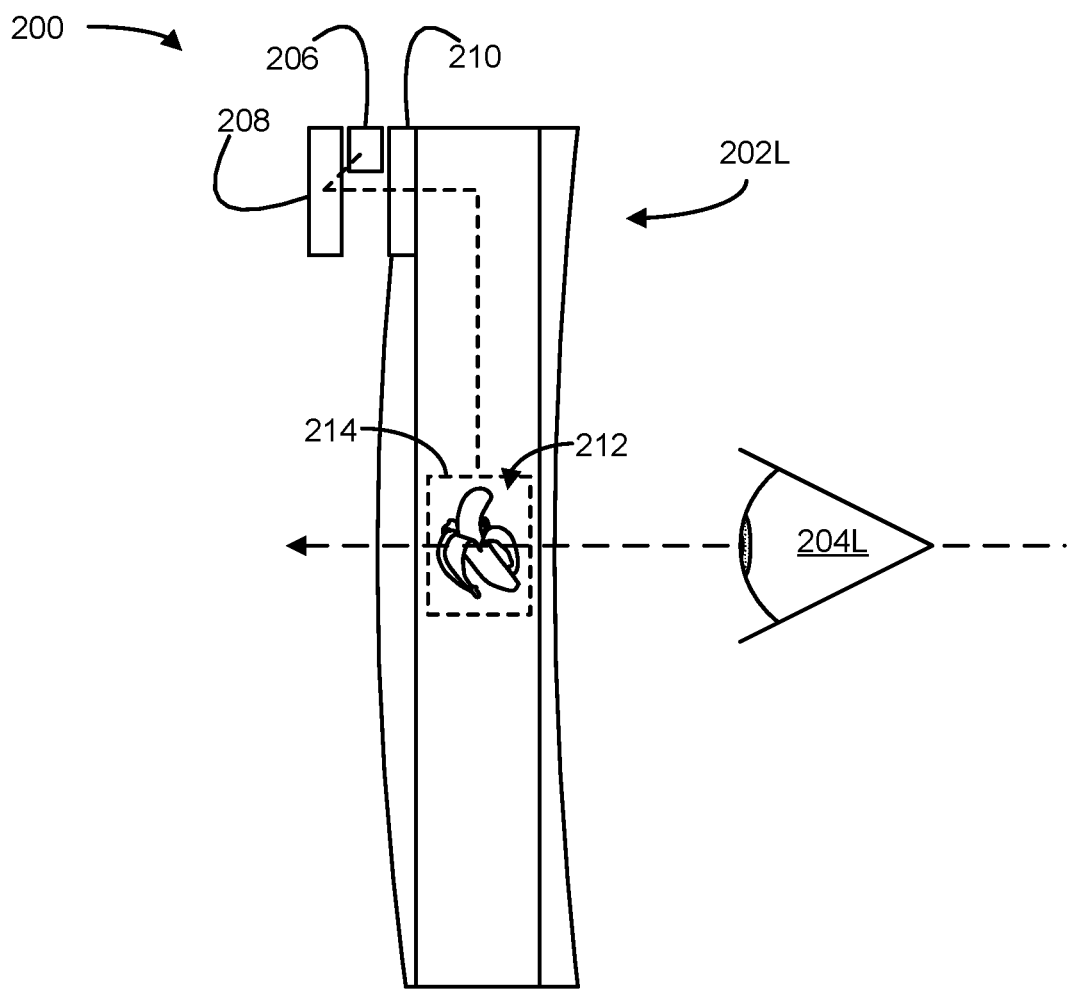
FIG. 2 schematically illustrates the presentation of a virtual object to a user via a liquid-crystal-on-silicon array.

Displaying of a digital image on a near-eye display may be performed in a variety of ways using a variety of suitable technologies. For example, in some implementations, the near-eye display associated with an augmented reality computing device may include two or more microprojectors, each configured to project light on or within the near-eye display. FIG. 2 shows a portion of an example near-eye display 200. Near-eye display 200 includes a left microprojector 202L situated in front of a user's left eye 204L. It will be appreciated that near-eye display 200 also includes a right microprojector situated in front of the user's right eye.

Near-eye display 200 includes a light source 206 and a liquid-crystal-on-silicon (LCOS) array 208. The light source may include an ensemble of light-emitting diodes (LEDs)— e.g., white LEDs or a distribution of red, green, and blue LEDs. The light source may be situated to direct its emission onto the LCOS array, which is configured to form a display image based on control signals received from a logic machine associated with an augmented reality computing device. The LCOS array may include numerous individually addressable display pixels arranged on a rectangular grid or other geometry, each of which is usable to show an image pixel of a digital image. In some embodiments, pixels reflecting red light may be juxtaposed in the array to pixels reflecting green and blue light, so that the LCOS array forms a color image. In other embodiments, a digital micromirror array may be used in lieu of the LCOS array, or an active-matrix LED array may be used instead. In still other embodiments, transmissive, backlit LCD or scanned-beam technology may be used to form the display image.

In some embodiments, the display image from LCOS array 208 may not be suitable for direct viewing by the user of near-eye display 200. In particular, the display image may be offset from the user's eye, may have an undesirable vergence, and/or a very small exit pupil (e.g., area of release of display light, not to be confused with the user's anatomical pupil). In view of these issues, the display image from the LCOS array may be further conditioned en route to the user's eye. For example, light from the LCOS array may pass through one or more lenses, such as lens 210, or other optical components of near-eye display 200, in order to reduce any offsets, adjust vergence, expand the exit pupil, etc.

Light projected by each microprojector 202 may take the form of a virtual image visible to a user, and occupy a particular screen-space position relative to the near-eye display, defined by a range of display pixels used to display the image. As shown, light from LCOS array 208 is forming virtual image 212 at screen-space position 214. Specifically, virtual image 212 is a banana, though any other virtual imagery may be displayed. An image may be formed by a complementary right microprojector, and occupy a screen-space position relative to the user's right eye. In some implementations, these two images may be offset from each other in such a way that they are interpreted by the user's visual cortex as a single, three-dimensional image. Accordingly, the user may perceive the images projected by the microprojectors as a three-dimensional object occupying a three-dimensional world-space position that is behind the screen-space position at which the virtual image is presented by the near-eye display. By cooperatively controlling the left and right microprojectors, world locked images, body locked images, and/or virtual images in any other frame of reference may be presented to the viewer.

The current source for each emission diode demands a certain amount of voltage headroom. For each emission diode, there exists a threshold voltage that causes the diode to reach peak output brightness (e.g., current). Once that voltage headroom is exceeded, the same amount of current is still pumped into the emission diode, thus wasting power. If voltage headroom is reduced to a point where the current source is starved, there will be an observable reduction in output brightness due to the reduced voltage, not because of the current set point.

There are two generic options for selecting a compliance voltage for the emission diodes. In one example, the forward voltage can be learned or approximated for each emission diode. More simply, a generic, large margin of headroom can be provided in setting the compliance voltage overhead. In such a scenario, power would be wasted on emission diodes with lower forward voltages.

Figure 3B:
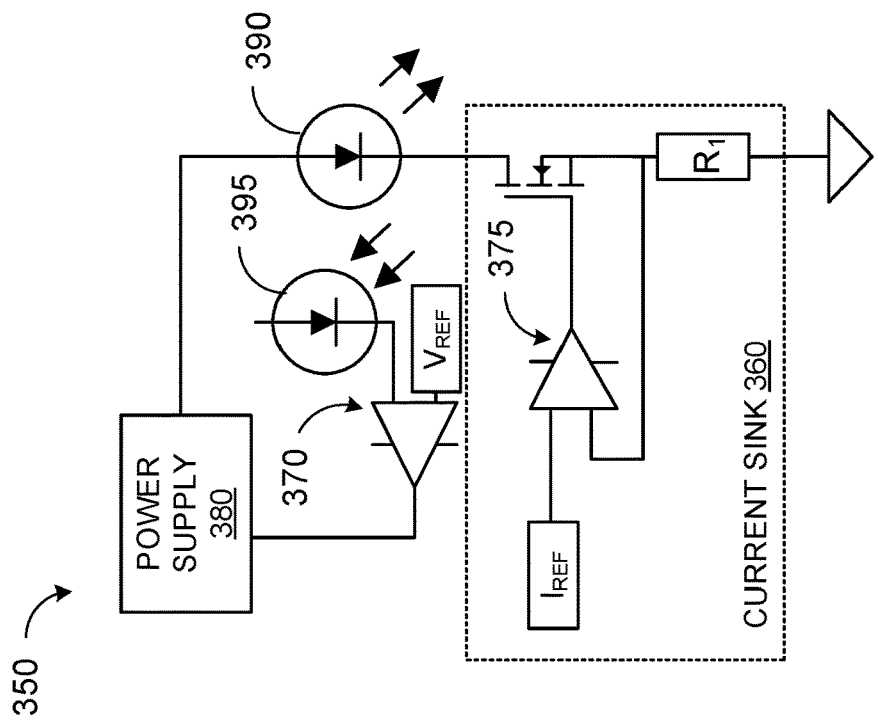
FIG. 3B schematically shows an example circuit for modulating compliance voltage for an emission diode based on output brightness.
Figure 3A:
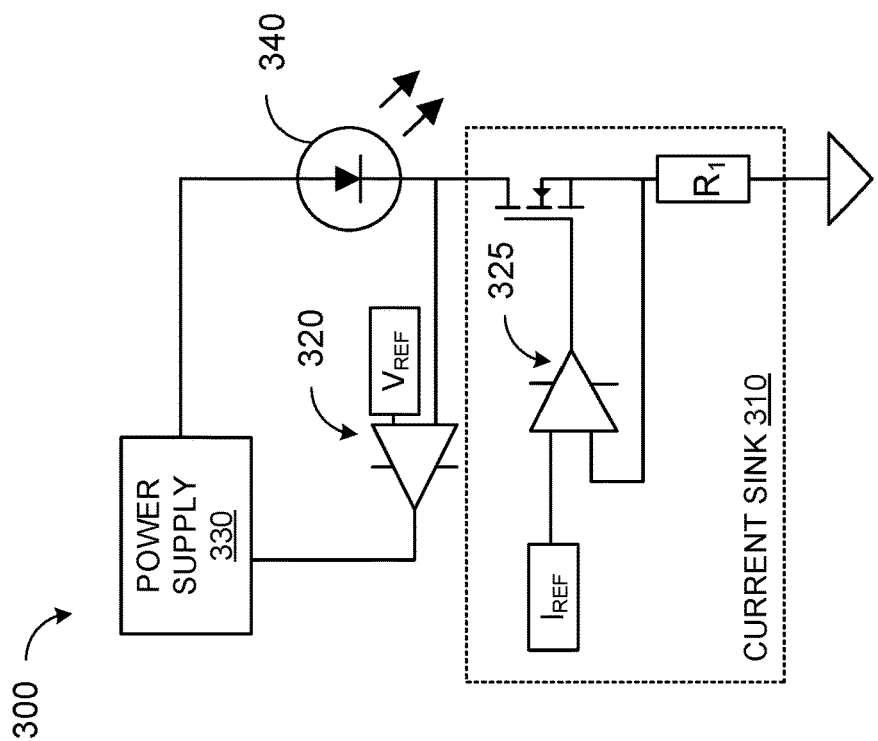
FIG. 3A schematically shows an example circuit for modulating compliance voltage for an emission diode.

FIG. 3A shows a schematic diagram for a circuit 300 for a constant-current LED system used to drive the LED to a specific output power. In this example, the current sink 310 is used as a limiting input to voltage headroom regulator 320 to ensure that the current regulator can draw the appropriate current from power supply 330 through LED 340. In some examples, the forward voltage of LED 340 may be monitored and used as feedback to adjust compliance voltage.

However, this configuration only takes into account the head room of the current sink, leaving other components of the system ignored. FIG. 3B shows a schematic diagram for a circuit 350 where output brightness of the LED is monitored and used to set the compliance voltage. Like circuit 300, circuit 350 is a constant-current circuit that includes a current sink 360, a voltage regulator 370, a current regulator 375, a power supply 380 and an LED 390. However, rather than monitoring the voltage of current sink 360, a photodiode 395 is used to monitor output brightness of LED 390, and to provide an input to voltage regulator 370. As such, the output of the entire light system is considered in setting the compliance voltage. In some examples, photodiodes may be employed to learn about how the efficiency of the LEDs change over time. In such systems, the included photodiodes may be leveraged so that additional componentry is unnecessary.

In this way, power supply 380 can be adjusted to ensure there is enough headroom through current sink 360 to maintain the set current while also minimizing overhead voltage. This mitigates power loss from setting a higher guard banded limit voltage for current sink 360. As will be described further herein and with regard to FIG. 4, the desired headroom setpoint may be set such that increasing voltage headroom yields no increase in brightness of LED 390, but decreasing voltage headroom does yield a decrease in brightness. This setpoint represents the most efficient point to drive power supply 380 and the effective headroom at current sink 360, without limiting the compliance voltage so low as to starve the current source.

Figure 4:
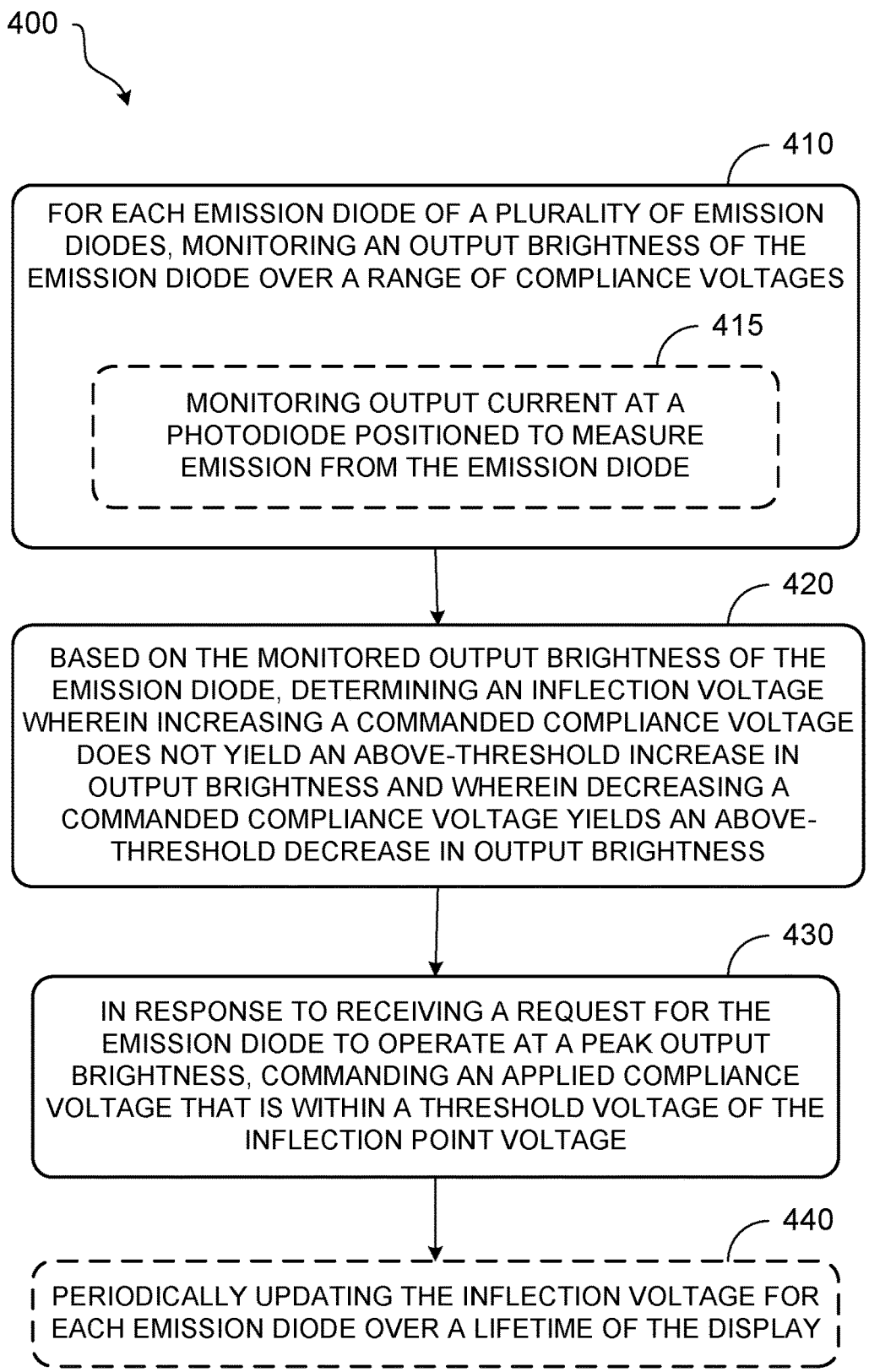
FIG. 4 is an example method for operating a display comprising a plurality of emission diodes.

FIG. 4 depicts an example method 400 for operating a display comprising a plurality of emission diodes. Method 400 may be executed by a controller, such as logic system 16 as described with regard to FIG. 1. In some examples, the emission diodes are light emitting diodes (LEDs). In such an example, the LEDs may include separate red, green, and blue LEDs. However, method 400 may also be applied to displays comprising one or more other types of emission diodes. As such, method 400 will be described with reference to circuit 350 as depicted in FIG. 3B, but other types of diode circuits may be used. Method 400 will primarily be described with reference to portable displays, such as near-eye displays (e.g., near-eye display system 10), in particular to projector style displays that incorporate an LCOS reflective panel, but may also be applied to other display types that utilize LEDs and/or other emission diodes.

At 410, method 400 includes, for each of a plurality of emission diodes, monitoring an output brightness of the emission diode over a range of compliance voltages. In some examples, monitoring an output brightness of the emission diode includes optically monitoring the output brightness of the emission diode. For example, optionally, at 415, method 400 includes monitoring output current at a photodiode positioned to measure emission from the emission diode. The photodiode may be dedicated to the emission diode. For example, the output current of LED 390 may be monitored with photodiode 395, as shown in FIG. 3B.

Monitoring the output brightness of the emission diode may include periodically taking output brightness measurements, such as every frame, every 10 frames, etc., and/or may occur opportunistically when a commanded compliance voltage falls within the range of compliance voltages. In some examples, the controller may perform micro-adjustments in compliance voltage to determine how output brightness changes over the compliance voltage range. As will be described further herein, the range of compliance voltages may include a range of compliance voltage values that result in peak output brightness for a given emission diode, as well as compliance voltage values that result in a sub-peak output brightness for the emission diode. The range of compliance voltages may be specific for the type of emission diode, for example, as different color LEDs demand different forward voltage settings. Output brightness may be sampled for a range of conditions (e.g., temperature, usage time) in order to learn how output brightness is affected by compliance voltage in different scenarios and/or conditions.

At 420, method 400 includes, based on the monitored output brightness of the emission diode, determining an inflection voltage wherein increasing a commanded compliance voltage does not yield an above-threshold increase in output brightness and wherein decreasing the commanded compliance voltage yields an above-threshold decrease in output brightness. In other words, the controller may compare requested emission power (e.g., commanded) from the emission diode to the observed power (e.g., as seen with a photodiode) to learn how changes in compliance voltage over a range affect output brightness, and then identify an inflection voltage that represents a baseline overhead voltage for generating a peak output voltage.

The above-threshold increase in output brightness and above-threshold decrease in output brightness may be set based on a first order change in output brightness with respect to increasing compliance voltage and/or a first derivative rate of change in output brightness with respect to increasing compliance voltage. For example, the threshold may be selected such that increasing compliance voltage by a certain number of milliamps above the inflection voltage may result in a nominal increase in first order brightness, but such that the rate of brightness increase will be significantly less when compared to corresponding first order brightness changes resulting from decreasing the compliance voltage below the inflection voltage by the same number of milliamps.

In other words, as increased compliance voltage and/or voltage headroom is commanded, there exists an inflection voltage where the emission diode brightness does not increase significantly, and where reducing the commanded compliance voltage and/or voltage headroom results in the emission diode becoming significantly dimmer. The inflection voltage thus represents a peak efficiency for the emission diode where there is minimal voltage headroom without a corresponding degradation in brightness. This determination may be made without measuring the forward voltage of each emission diode, and may further be made without measuring the voltage of the current source.

Figure 5A:
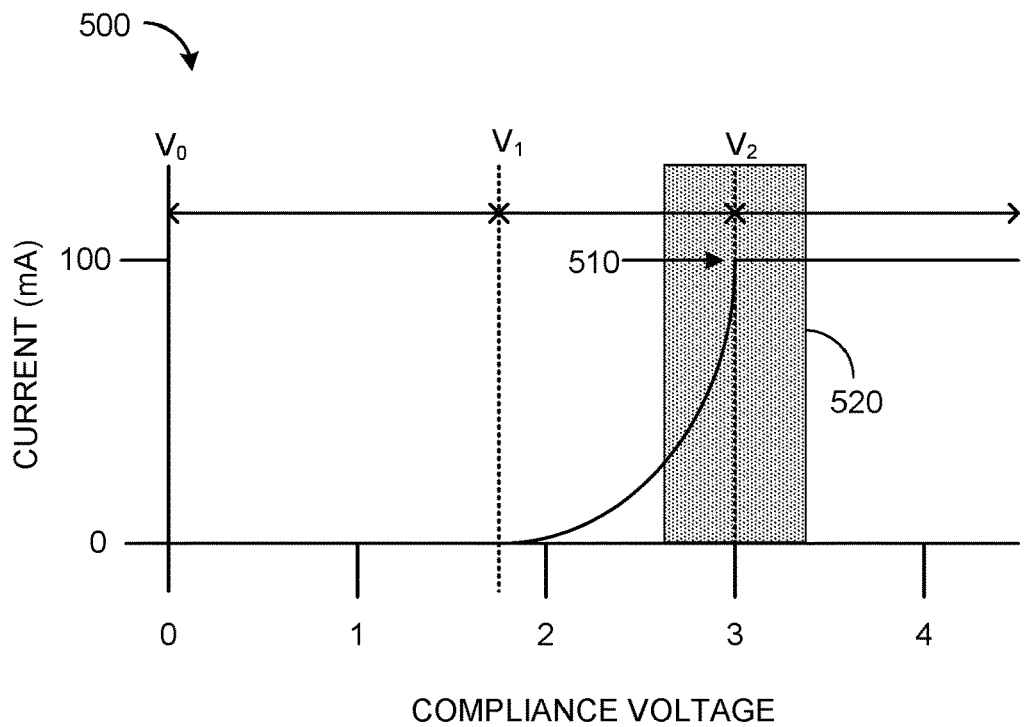
FIG. 5A is an idealized graph depicting compliance voltage against current at a first temperature.

As an example, FIG. 5A shows an idealized graph 500 plotting compliance voltage against current (output brightness) for an LED at a constant temperature ($T_1$). In this example, the requested output brightness is 100 mA, and the forward voltage for the LED is 2.5 V.

From $V_0$ (0 V) to $V_1$ (1.75 V), the compliance voltage is insufficient to generate current through the LED, and no output brightness is detected. From $V_1$ to $V_2$ (3.0 V), the output brightness increases with increasing compliance voltage. For voltages greater than $V_2$, the output brightness does not increase above 100 mA. Applying compliance voltages less than $V_2$ does decrease the output brightness. As such, $V_2$ may be considered the inflection voltage 510, adding 0.5 V of headroom to the 2.5 V forward voltage for a compliance voltage of 3.0 V. In a practical application, increasing the compliance voltage beyond $V_2$ may indeed result in a marginal increase in brightness. However, thresholds around inflection voltage can be set as desired to identify an inflection point that better balances the power savings and ease of control. In practicality, the continuum of compliance voltages from $V_0$ to upwards of 4.0 V does not need to be monitored for output brightness. Rather, a range 520 may be monitored, such that range 520 includes compliance voltage values both less than and greater than inflection voltage 510. As shown in FIG. 5A, range 520 includes compliance voltages +/−0.3 V from inflection voltage 510, but may be a smaller or larger range, and may not be symmetric around inflection voltage 510.

Figure 5B:
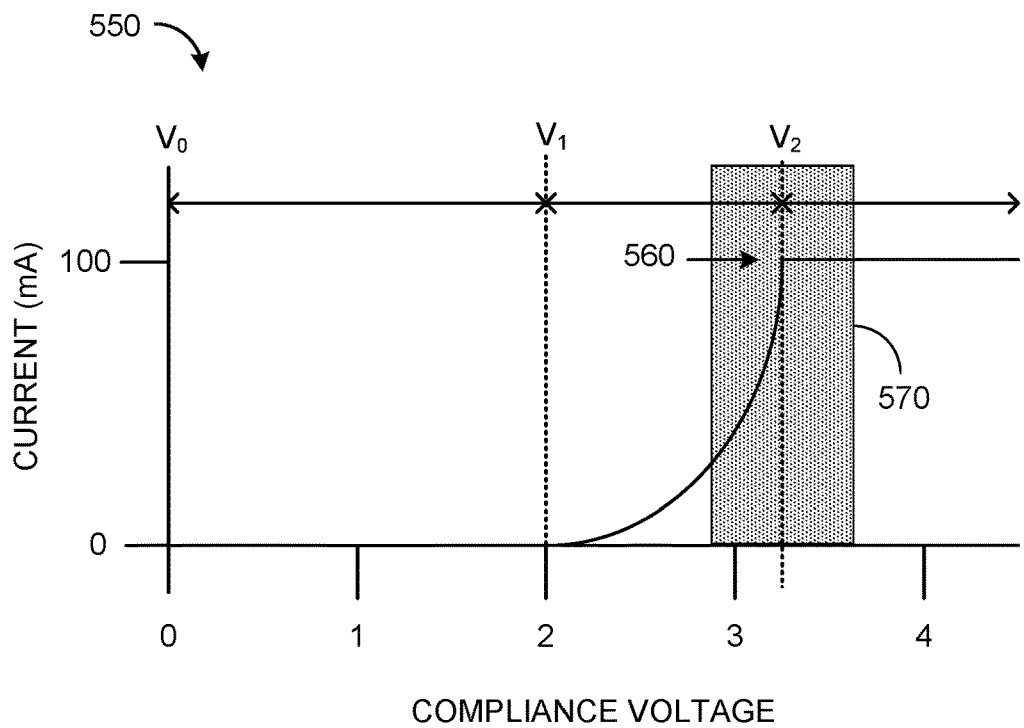
FIG. 5B is an idealized graph depicting compliance voltage against current at a second temperature.

FIG. 5B shows an idealized graph 550 plotting compliance voltage against current (output brightness) for an LED at a constant temperature ($T_2$), where $T_2$ is greater than $T_1$. In this example, the requested output brightness is 100 mA, and the forward voltage for the LED is 2.75 V. Because of the temperature increase, additional forward voltage must be applied in order to generate the same amount of output brightness.

Similarly to graph 500, in graph 550, from $V_0$ (0 V) to $V_1$ (2.0 V), the compliance voltage is insufficient to generate current through the LED, and no output brightness is detected. From $V_1$ to $V_2$ (3.25 V), the output brightness increases with increasing compliance voltage. For voltages greater than $V_2$, the output brightness does not increase above 100 mA. As such, $V_2$ may be considered the inflection voltage 560, adding the same amount of headroom as in graph 500 (0.5 V) to the 2.75 V forward voltage for a compliance voltage of 3.25 V. Monitoring of output brightness may be performed for voltages across range 570, which includes compliance voltage values both less than and greater than inflection voltage 560.

In either graph 500 or graph 550, if, for a given inflection voltage, the observed brightness is less than the commanded brightness, it can be inferred that either the applied compliance voltage is insufficient, there has been a change in the efficiency of the LED itself, and/or that there is a deficiency somewhere in the chain from electrical input power to optical output power from the photodiode. Such an observation may point to a recalibration of the LED through monitoring output brightness over a range of compliance voltages to extract an updated inflection voltage.

Returning to FIG. 4, at 430 method 400 includes, in response to receiving a request for the emission diode to operate at a peak output brightness, commanding an applied compliance voltage that is within a threshold voltage of the inflection point voltage. In some examples, this may include setting the voltage headroom by adjusting a power supply voltage so that the voltage headroom through the current sink is sufficient to maintain the requested brightness. The inflection voltage for each emission diode may be stored in one or more lookup tables, for example. In such examples, the inflection voltage for a specific emission diode may be retrieved from a lookup table in response to receiving an operating request, and the controller may command a compliance voltage based on the retrieved inflection voltage.

In some examples, method 400 may include receiving a request for an emission diode to emit a desired output brightness that is less than the output brightness generated by supplying the inflection voltage. In such examples, method 400 may include determining an adjusted voltage headroom based on the inflection voltage, and commanding an adjusted compliance voltage for the desired output brightness based on the adjusted headroom voltage. For example, as shown in FIGS. 5A and 5B, the current at an emission diode may be reduced by reducing the compliance voltage below the inflection voltage. By reducing the voltage headroom and maintaining the forward voltage, the current source may be starved, resulting in a reduction in current at the emission diode and thus a reduction in output brightness. In some examples, the inflection voltage may be used to determine a forward voltage for the emission diode and the adjusted voltage headroom may be determined based on this determined forward voltage. In other examples, the compliance voltage that is to be applied to generate the desired output brightness may be determined directly from the calibration curves generated based on the monitored output brightness of the emission diode.

In some examples, the controller may receive requests for two or more emission diodes to generate a same output brightness. Responsive to retrieving different inflection voltages for each respective emission diode, the controller may command different compliance voltages for each of the two or more emission diodes.

Optionally, at 440, method 400 includes updating the inflection voltage for each emission diode one or more times over a lifetime of the display. As the emission diodes age, their efficiencies generally decrease. By updating the inflection voltage, the display may be maintained at full capacity and at peak-efficiency, even if that efficiency degrades, and especially if that efficiency degrades in a non-uniform fashion across the array of emission diodes. The monitoring step described at 410 may thus be implemented as a scheduled calibration step, which may be scheduled based on a lapsed amount of operating time, real time, total power expenditure, etc. from the most recently scheduled update of inflection voltages. In some examples, the inflection voltages may be updated responsive to an event, such as a power surge, component failure and/or replacement, etc. Additionally or alternatively, the inflection voltages may be updated periodically.

Figure 6:
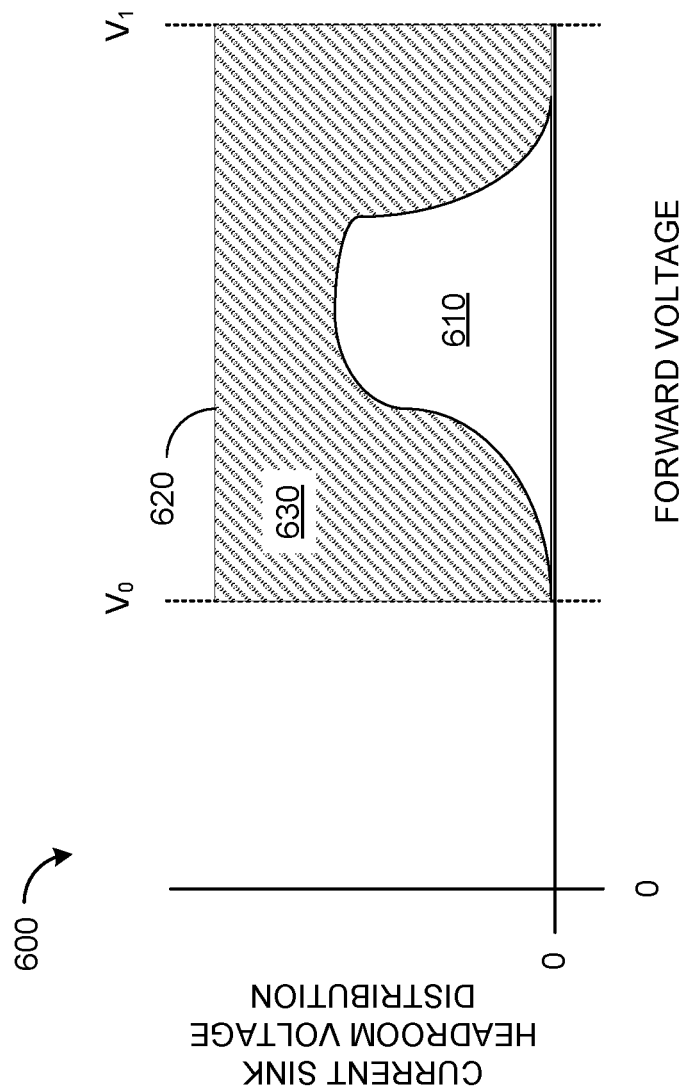
FIG. 6 is a theoretical graph indicating power savings realized by setting compliance voltage based on output brightness.

By applying method 400 and/or circuit 350, significant power savings may be realized. FIG. 6 is an example theoretical graph 600 plotting forward voltage against current sink headroom voltage distribution. Plot 610 indicates an example distribution of baseline forward voltage for a plurality of emission diodes. Plot 620 represents voltage regulation as set by a guard-banded limiter.

Across a panel of emission diodes, the current source that is sinking the current has a certain distribution. For example, a current source may be provided with a specification of 1 ohm resistance, and thus would take an application of at least 100 mV in order to generate 100 milliamps. In reality, the resistance will have a certain distribution, e.g., between 0.8 and 1.2 ohms. This distribution is reflected in plot 610.

Currently, semiconductor manufacturers take that distribution of current source resistance, and add a standard deviation on top of it to ensure that there is enough voltage headroom regardless of what the actual resistance is. This is represented in plot 620, where the same headroom voltage is applied to diodes with all possible forward voltage demands.

By determining actual output brightness for commanded brightness, and by determining an inflection voltage for each emission diode, a significant power savings may be realized, as shown at 630. In this way, power is not wasted by guessing at the resistance of the current source or by applying additional voltage regardless of the current source resistance. By calibrating each emission diode based on the output brightness itself, the entire diode circuit is accounted for, allowing for the application of a more modest voltage that takes advantage of this current sink resistance distribution.

In some embodiments, the methods and processes described herein may be tied to a computing system of one or more computing devices. In particular, such methods and processes may be implemented as a computer-application program or service, an application-programming interface (API), a library, and/or other computer-program product.

Figure 7:
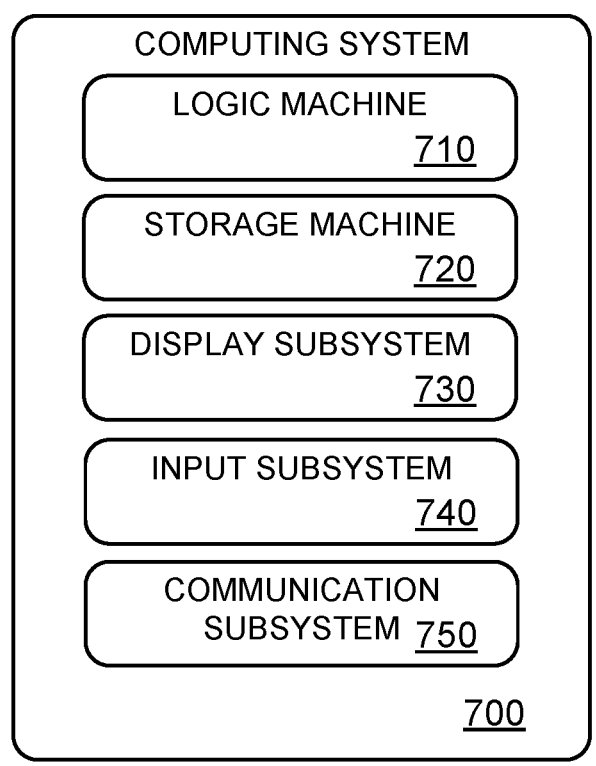
FIG. 7 schematically shows an example computing environment.

FIG. 7 schematically shows a non-limiting embodiment of a computing system 700 that can enact one or more of the methods and processes described above. Computing system 700 is shown in simplified form. Computing system 700 may take the form of one or more personal computers, server computers, tablet computers, home-entertainment computers, network computing devices, gaming devices, mobile computing devices, mobile communication devices (e.g., smart phone), and/or other computing devices.

Computing system 700 includes a logic machine 710 and a storage machine 720. Computing system 700 may optionally include a display subsystem 730, input subsystem 740, communication subsystem 750, and/or other components not shown in FIG. 7.

Logic machine 710 includes one or more physical devices configured to execute instructions. For example, the logic machine may be configured to execute instructions that are part of one or more applications, services, programs, routines, libraries, objects, components, data structures, or other logical constructs. Such instructions may be implemented to perform a task, implement a data type, transform the state of one or more components, achieve a technical effect, or otherwise arrive at a desired result.

The logic machine may include one or more processors configured to execute software instructions. Additionally or alternatively, the logic machine may include one or more hardware or firmware logic machines configured to execute hardware or firmware instructions. Processors of the logic machine may be single-core or multi-core, and the instructions executed thereon may be configured for sequential, parallel, and/or distributed processing. Individual components of the logic machine optionally may be distributed among two or more separate devices, which may be remotely located and/or configured for coordinated processing. Aspects of the logic machine may be virtualized and executed by remotely accessible, networked computing devices configured in a cloud-computing configuration.

Storage machine 720 includes one or more physical devices configured to hold instructions executable by the logic machine to implement the methods and processes described herein. When such methods and processes are implemented, the state of storage machine 720 may be transformed—e.g., to hold different data.

Storage machine 720 may include removable and/or built-in devices. Storage machine 720 may include optical memory (e.g., CD, DVD, HD-DVD, Blu-Ray Disc, etc.), semiconductor memory (e.g., RAM, EPROM, EEPROM, etc.), and/or magnetic memory (e.g., hard-disk drive, floppy-disk drive, tape drive, MRAM, etc.), among others. Storage machine 720 may include volatile, nonvolatile, dynamic, static, read/write, read-only, random-access, sequential-access, location-addressable, file-addressable, and/or content-addressable devices.

It will be appreciated that storage machine 720 includes one or more physical devices. However, aspects of the instructions described herein alternatively may be propagated by a communication medium (e.g., an electromagnetic signal, an optical signal, etc.) that is not held by a physical device for a finite duration.

Aspects of logic machine 710 and storage machine 720 may be integrated together into one or more hardware-logic components. Such hardware-logic components may include field-programmable gate arrays (FPGAs), program- and application-specific integrated circuits (PASIC/ASICs), program- and application-specific standard products (PSSP/ASSPs), system-on-a-chip (SOC), and complex programmable logic devices (CPLDs), for example.

The terms "module," "program," and "engine" may be used to describe an aspect of computing system 700 implemented to perform a particular function. In some cases, a module, program, or engine may be instantiated via logic machine 710 executing instructions held by storage machine 720. It will be understood that different modules, programs, and/or engines may be instantiated from the same application, service, code block, object, library, routine, API, function, etc. Likewise, the same module, program, and/or engine may be instantiated by different applications, services, code blocks, objects, routines, APIs, functions, etc. The terms "module," "program," and "engine" may encompass individual or groups of executable files, data files, libraries, drivers, scripts, database records, etc.

It will be appreciated that a "service", as used herein, is an application program executable across multiple user sessions. A service may be available to one or more system components, programs, and/or other services. In some implementations, a service may run on one or more server-computing devices.

When included, display subsystem 730 may be used to present a visual representation of data held by storage machine 720. This visual representation may take the form of a graphical user interface (GUI). As the herein described methods and processes change the data held by the storage machine, and thus transform the state of the storage machine, the state of display subsystem 730 may likewise be transformed to visually represent changes in the underlying data. Display subsystem 730 may include one or more display devices utilizing virtually any type of technology. Such display devices may be combined with logic machine 710 and/or storage machine 720 in a shared enclosure, or such display devices may be peripheral display devices.

When included, input subsystem 740 may comprise or interface with one or more user-input devices such as a keyboard, mouse, touch screen, or game controller. In some embodiments, the input subsystem may comprise or interface with selected natural user input (NUI) componentry. Such componentry may be integrated or peripheral, and the transduction and/or processing of input actions may be handled on- or off-board. Example NUI componentry may include a microphone for speech and/or voice recognition; an infrared, color, stereoscopic, and/or depth camera for machine vision and/or gesture recognition; a head tracker, eye tracker, accelerometer, and/or gyroscope for motion detection and/or intent recognition; as well as electric-field sensing componentry for assessing brain activity.

When included, communication subsystem 750 may be configured to communicatively couple computing system 700 with one or more other computing devices. Communication subsystem 750 may include wired and/or wireless communication devices compatible with one or more different communication protocols. As non-limiting examples, the communication subsystem may be configured for communication via a wireless telephone network, or a wired or wireless local- or wide-area network. In some embodiments, the communication subsystem may allow computing system 700 to send and/or receive messages to and/or from other devices via a network such as the Internet.

In one example, a method for operating a display comprising a plurality of emission diodes comprises, for each emission diode, monitoring an output brightness of the emission diode over a range of compliance voltages; based on the monitored output brightness of the emission diode, determining an inflection voltage wherein increasing a commanded compliance voltage does not yield an above-threshold increase in output brightness and wherein decreasing the commanded compliance voltage yields an above-threshold decrease in output brightness; and in response to receiving a request for the emission diode to operate at a peak output brightness, commanding an applied compliance voltage that is within a threshold voltage of the inflection voltage. In such an example, or any other example, monitoring output brightness of the emission diode additionally or alternatively comprises optically monitoring output brightness of the emission diode. In any of the preceding examples, or any other example, optically monitoring output brightness of the emission diode additionally or alternatively comprises monitoring output current at a photodiode. In any of the preceding examples, or any other example, the method additionally or alternatively comprises updating the inflection voltage for each emission diode one or more times over a lifetime of the display. In any of the preceding examples, or any other example, the method additionally or alternatively comprises receiving a request for the emission diode to emit a desired output brightness that is less than the output brightness generated by supplying the inflection voltage; determining an adjusted voltage headroom based on the inflection voltage; and commanding an adjusted compliance voltage for the desired output brightness based on the adjusted voltage headroom. In any of the preceding examples, or any other example, the method additionally or alternatively comprises receiving requests for two or more emission diodes to generate a same output brightness; and commanding different compliance voltages for each of the two or more emission diodes based on the inflection voltage for each respective emission diode. In any of the preceding examples, or any other example, the emission diode is additionally or alternatively a light emitting diode.

In another example, a system for an optical display comprises a plurality of light emitting diodes (LEDs); and a controller configured to, for each LED, monitor an output brightness of the LED over a range of compliance voltages; based on the monitored output brightness of the LED, determine an inflection voltage wherein increasing a commanded compliance voltage does not yield an above-threshold increase in output brightness and wherein decreasing the commanded compliance voltage yields an above-threshold decrease in output brightness; and in response to receiving a request for the LED to operate at a peak output brightness, command an applied compliance voltage that is within a threshold voltage of the inflection voltage. In such an example, or any other example the controller is additionally or alternatively configured to optically monitor the output brightness of the LED over the range of compliance voltages. In any of the preceding examples, or any other example, optically monitoring output brightness of each LED additionally or alternatively includes monitoring output current at a respective photodiode. In any of the preceding examples, or any other example, the controller is further additionally or alternatively configured to update the inflection voltage for each LED one or more times over a lifetime of the optical display. In any of the preceding examples, or any other example, the controller is additionally or alternatively configured to receive a request for the LED to emit a desired output brightness that is less than the output brightness generated by supplying the inflection voltage; determine an adjusted voltage headroom based on the inflection voltage; and command an adjusted compliance voltage for the desired output brightness based on the adjusted voltage headroom. In any of the preceding examples, or any other example, the controller is additionally or alternatively configured to receive requests for two or more LEDs to generate a same output brightness; and command different compliance voltages for each of the two or more LEDs based on the inflection voltage for each respective LED. In any of the preceding examples, or any other example, the optical display is additionally or alternatively a liquid crystal on silicon display.

In yet another example, a system for an optical display comprise a plurality of light emitting diodes (LEDs), each LED electrically coupled to a current sink and to a power supply adjusted by a voltage regulator, the voltage regulator coupled to a photodiode configured to optically monitor output brightness of the LED; and a controller configured to, for each LED, monitor the output brightness of the LED at the photodiode over a range of compliance voltages; based on the monitored output brightness of the LED, determine an inflection voltage wherein increasing a commanded compliance voltage does not yield an above-threshold increase in output brightness and wherein decreasing the commanded compliance voltage yields an above-threshold decrease in output brightness; and in response to receiving a request for the LED to operate at a peak output brightness, command an applied compliance voltage that is within a threshold voltage of the inflection voltage. In such an example, or any other example, for each LED, the voltage regulator is additionally or alternatively not electrically coupled to the forward voltage of the LED. In any of the preceding examples, or any other example, for each LED, the voltage regulator is additionally or alternatively not electrically coupled to the current sink. In any of the preceding examples, or any other example, the controller is additionally or alternatively configured to update the inflection voltage for each LED one or more times over a lifetime of the optical display. In any of the preceding examples, or any other example, the controller is additionally or alternatively configured to receive a request for the LED to emit a desired output brightness that is less than the output brightness generated by supplying the inflection voltage; determine an adjusted voltage headroom based on the inflection voltage; and command an adjusted compliance voltage for the desired output brightness based on the adjusted voltage headroom. In any of the preceding examples, or any other example, the controller is additionally or alternatively configured to receive requests for two or more LEDs to generate a same output brightness; and command different compliance voltages for each of the two or more LEDs based on the inflection voltage for each respective LED.

It will be understood that the configurations and/or approaches described herein are exemplary in nature, and that these specific embodiments or examples are not to be considered in a limiting sense, because numerous variations are possible. The specific routines or methods described herein may represent one or more of any number of processing strategies. As such, various acts illustrated and/or described may be performed in the sequence illustrated and/or described, in other sequences, in parallel, or omitted. Likewise, the order of the above-described processes may be changed.

The subject matter of the present disclosure includes all novel and non-obvious combinations and sub-combinations of the various processes, systems and configurations, and other features, functions, acts, and/or properties disclosed herein, as well as any and all equivalents thereof.

The invention claimed is:

1. A method for operating a display comprising a plurality of emission diodes, the method comprising:
   for each emission diode, monitoring an output brightness of the emission diode over a range of compliance voltages;
   based on the monitored output brightness of the emission diode, determining an inflection voltage wherein increasing a commanded compliance voltage does not yield an above-threshold increase in output brightness and wherein decreasing the commanded compliance voltage yields an above-threshold decrease in output brightness; and
   in response to receiving a request for the emission diode to operate at a peak output brightness, commanding an applied compliance voltage that is within a threshold voltage of the inflection voltage.

2. The method of claim 1, wherein monitoring output brightness of the emission diode comprises optically monitoring output brightness of the emission diode.

3. The method of claim 2, wherein optically monitoring output brightness of the emission diode comprises monitoring output current at a photodiode.

4. The method of claim 1, further comprising:
   updating the inflection voltage for each emission diode one or more times over a lifetime of the display.

5. The method of claim 1, further comprising:
   receiving a request for the emission diode to emit a desired output brightness that is less than the output brightness generated by supplying the inflection voltage;
   determining an adjusted voltage headroom based on the inflection voltage; and
   commanding an adjusted compliance voltage for the desired output brightness based on the adjusted voltage headroom.

6. The method of claim 1, further comprising:
   receiving requests for two or more emission diodes to generate a same output brightness; and
   commanding different compliance voltages for each of the two or more emission diodes based on the inflection voltage for each respective emission diode.

7. The method of claim 1, wherein the emission diode is a light emitting diode.

8. A system for an optical display, comprising:
   a plurality of light emitting diodes (LEDs); and
   a controller configured to:
      for each LED, monitor an output brightness of the LED over a range of compliance voltages;
      based on the monitored output brightness of the LED, determine an inflection voltage wherein increasing a commanded compliance voltage does not yield an above-threshold increase in output brightness and wherein decreasing the commanded compliance voltage yields an above-threshold decrease in output brightness; and
      in response to receiving a request for the LED to operate at a peak output brightness, command an applied compliance voltage that is within a threshold voltage of the inflection voltage.

9. The system of claim 8, wherein the controller is configured to optically monitor the output brightness of the LED over the range of compliance voltages.

10. The system of claim 8, wherein optically monitoring output brightness of each LED includes monitoring output current at a respective photodiode.

11. The system of claim 8, wherein the controller is further configured to update the inflection voltage for each LED one or more times over a lifetime of the optical display.

12. The system of claim 8, wherein the controller is further configured to:
receive a request for the LED to emit a desired output brightness that is less than the output brightness generated by supplying the inflection voltage;
determine an adjusted voltage headroom based on the inflection voltage; and
command an adjusted compliance voltage for the desired output brightness based on the adjusted voltage headroom.

13. The system of claim 8, wherein the controller is further configured to:
receive requests for two or more LEDs to generate a same output brightness; and
command different compliance voltages for each of the two or more LEDs based on the inflection voltage for each respective LED.

14. The system of claim 8, wherein the optical display is a liquid crystal on silicon display.

15. A system for an optical display, comprising:
a plurality of light emitting diodes (LEDs), each LED electrically coupled to a current sink and to a power supply adjusted by a voltage regulator, the voltage regulator coupled to a photodiode configured to optically monitor output brightness of the LED; and
a controller configured to:
for each LED, monitor the output brightness of the LED at the photodiode over a range of compliance voltages;
based on the monitored output brightness of the LED, determine an inflection voltage wherein increasing a commanded compliance voltage does not yield an above-threshold increase in output brightness and wherein decreasing the commanded compliance voltage yields an above-threshold decrease in output brightness, the above-threshold increase in output brightness and above-threshold decrease in output brightness set based on one or more of a first order change in output brightness with respect to increasing compliance voltage and a first derivative rate of change in output brightness with respect to increasing compliance voltage; and
in response to receiving a request for the LED to operate at a peak output brightness, command an applied compliance voltage that is within a threshold voltage of the inflection voltage.

16. The system of claim 15, wherein, for each LED, the forward voltage of the LED is not electrically coupled to an input of the voltage regulator.

17. The system of claim 15, wherein, for each LED, the current sink LED is not electrically coupled to an input of the voltage regulator.

18. The system of claim 15, wherein the controller is further configured to update the inflection voltage for each LED one or more times over a lifetime of the optical display.

19. The system of claim 15, wherein the controller is further configured to:
receive a request for the LED to emit a desired output brightness that is less than the output brightness generated by supplying the inflection voltage;
determine an adjusted voltage headroom based on the inflection voltage; and
command an adjusted compliance voltage for the desired output brightness based on the adjusted voltage headroom.

20. The system of claim 15, wherein the controller is further configured to:
receive requests for two or more LEDs to generate a same output brightness; and
command different compliance voltages for each of the two or more LEDs based on the inflection voltage for each respective LED.

\* \* \* \* \*